(12) United States Patent
Lund

(10) Patent No.: US 12,458,008 B2
(45) Date of Patent: Nov. 4, 2025

(54) FISHING ROD ASSEMBLY WITH INTEGRATED ENERGY STORAGE

(71) Applicant: Dominion Rods LLC, Palm City, FL (US)

(72) Inventor: Jeremy Lund, Palm City, FL (US)

(73) Assignee: Dominion Rods LLC, Palm City, FL (US)

( * ) Notice: Subject to any disclaimer, the term of this patent is extended or adjusted under 35 U.S.C. 154(b) by 0 days.

(21) Appl. No.: 18/920,743

(22) Filed: Oct. 18, 2024

(65) Prior Publication Data

US 2025/0127152 A1 Apr. 24, 2025

Related U.S. Application Data

(60) Provisional application No. 63/592,112, filed on Oct. 20, 2023.

(51) Int. Cl.
| | | |
|---|---|---|
| *A01K 87/00* | (2006.01) | |
| *A01K 87/08* | (2006.01) | |
| *A01K 89/012* | (2006.01) | |
| *H01M 50/247* | (2021.01) | |
| *A01K 89/017* | (2006.01) | |

(52) U.S. Cl.
CPC ............ *A01K 87/007* (2013.01); *A01K 87/08* (2013.01); *A01K 89/012* (2013.01); *H01M 50/247* (2021.01); *A01K 89/017* (2013.01)

(58) Field of Classification Search
CPC .... A01K 87/007; A01K 87/08; A01K 89/012; A01K 89/017
See application file for complete search history.

(56) References Cited

U.S. PATENT DOCUMENTS

| | | | |
|---|---|---|---|
| 2,152,385 A | | 3/1939 | Mayer et al. |
| 3,248,819 A | | 5/1966 | Stealy |
| 3,252,239 A | | 5/1966 | Moeller |
| 3,348,788 A | * | 10/1967 | Vinokur .......... A01K 89/01123 242/321 |
| 4,050,179 A | | 9/1977 | Johnson |
| 4,083,141 A | | 4/1978 | Shedd et al. |
| 5,004,181 A | * | 4/1991 | Fowles ................ A01K 89/012 43/26.1 |
| 6,220,538 B1 | | 4/2001 | Durso |
| 6,318,653 B1 | * | 11/2001 | Dobbins .............. A01K 89/012 43/26.1 |
| 6,449,895 B1 | | 9/2002 | Zabihi |
| 6,880,775 B1 | | 4/2005 | Wenzel |

(Continued)

FOREIGN PATENT DOCUMENTS

| | | |
|---|---|---|
| CN | 213784938 U | 7/2021 |
| JP | 2-177841 A | 7/1990 |

(Continued)

*Primary Examiner* — Michael H Wang
(74) *Attorney, Agent, or Firm* — Hinckley, Allen & Snyder; Stephen Holmes

(57) ABSTRACT

A fishing rod assembly for electrically powered fishing reels includes an integrated battery power source located in a removable rod butt of the fishing rod. The rod butt assembly of the fishing rod interfaces with the bottom end of the reel seat with mating male/female ferrule and electrical connectors. A wiring harness extends up through the inside of the reel seat to a power connector egress body located above the reel seat.

20 Claims, 12 Drawing Sheets

(56) References Cited

U.S. PATENT DOCUMENTS

| | | |
|---|---|---|
| 7,073,740 B2 | 7/2006 | Westhoff |
| 7,269,922 B1 | 9/2007 | Mack |
| 7,793,877 B2 | 9/2010 | Ogino et al. |
| 8,104,219 B1 * | 1/2012 | Pace .................... A01K 87/007 43/17 |
| 8,579,222 B1 | 11/2013 | Alvarez |
| 8,640,376 B2 | 2/2014 | Badur et al. |
| 8,832,990 B2 | 9/2014 | Morris |
| 8,833,689 B1 | 9/2014 | Brown |
| 9,060,500 B2 * | 6/2015 | Lauzon ................ A01K 89/012 |
| 10,779,523 B2 | 9/2020 | DeFreitas |
| 11,147,253 B2 | 10/2021 | Washington et al. |
| 11,484,018 B2 * | 11/2022 | Wenzhi .................. A01K 87/08 |
| 12,096,756 B2 * | 9/2024 | Kaneko .................. A01K 87/06 |
| 2008/0000138 A1 | 1/2008 | Cummings |
| 2010/0251596 A1 | 10/2010 | Malcarne |
| 2013/0276348 A1 * | 10/2013 | Lauzon ................ A01K 87/007 43/21 |
| 2018/0317471 A1 | 11/2018 | McLaughlin |
| 2019/0166815 A1 * | 6/2019 | Malcarne ................ A01K 87/06 |
| 2020/0260707 A1 * | 8/2020 | Mullen ................ A01K 89/017 |
| 2021/0161116 A1 * | 6/2021 | Malcarne ................ A01K 87/06 |
| 2022/0007626 A1 * | 1/2022 | Wenzhi ............... A01K 89/0183 |

FOREIGN PATENT DOCUMENTS

| | | |
|---|---|---|
| JP | 0081667 Y2 | 1/1996 |
| JP | 2002233293 A | 8/2002 |
| JP | 2010-29176 A | 2/2010 |
| JP | 5448796 B2 | 5/2011 |
| KR | 20060000120 U | 12/2006 |
| KR | 100844459 B1 | 7/2008 |
| KR | 10-2516089 B1 | 3/2023 |

\* cited by examiner

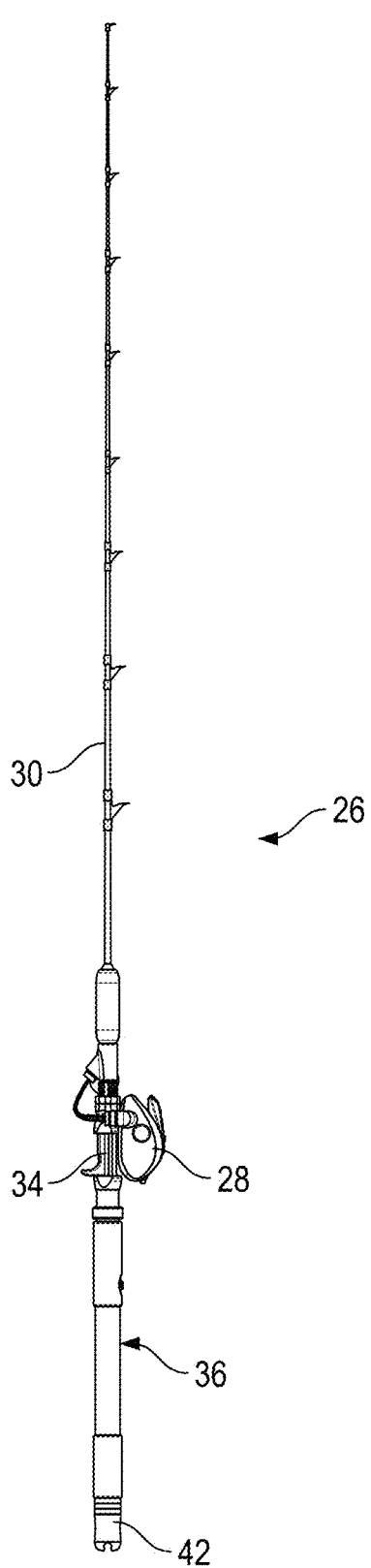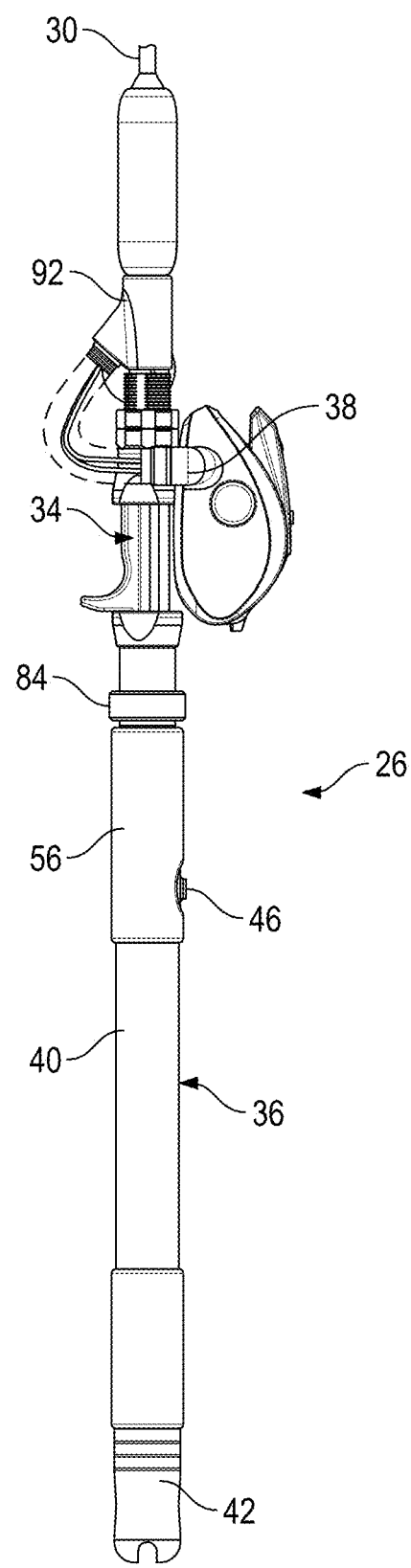
FIG. 3
FIG. 4

FISHING ROD ASSEMBLY WITH INTEGRATED ENERGY STORAGE

CROSS-REFERENCE TO RELATED APPLICATIONS

This application is a non-provisional filing of and claims the benefit of U.S. Provisional Patent Application No. 63/592,112, filed Oct. 20, 2023, the entire contents of which are incorporated herein by reference.

BACKGROUND OF THE DISCLOSURE

(1) Field of the Invention

The instant disclosure generally relates to fishing rods and reels and more particularly to fishing rods which utilize electric powered reel systems requiring a power source.

(2) Description of Related Art

A fishing rod 10 generally comprises a rod blank 12 with eyelets 14, a reel seat 16, a reel 18, a butt stock 20 at the lower end of the reel seat and a rod butt 22 including a gimbal 24 (See FIG. 1).

Electric powered reel systems are known in the art and include an electric motor to assist with reeling of the line. Electric reels also typically include a manual handle for unpowered use. Electric reels may be used when fishing in deep waters to assist with reeling in large lengths of line, or may be used by persons with disabilities or young people to assist in reeling in line. Such reels require an external power source for operation with the power source usually being provided by an external battery pack which may hang from, or be attached to the rod, or which may be provided by an external power connection provided on a boat.

Generally, electric powered reels have a standardized plug port which receives a power cord from the battery pack or boat power system. As can be appreciated, an external battery pack hanging from a rod may interfere with operation and use of the rod. The battery packs also add substantial weight to the rod and it often adds the weight in inconvenient or undesirable locations where the balance of the rod is thrown off thus making the rod difficult to hold. In cases where the power is provided by a long power cord from the boat, the dangling cord may interfere with movement of the user and could potentially cause entanglements, falls and injuries to the user and others on the boat.

Attempts have been made to integrate the battery storage and electric reels into a single rod and reel system, however, these prior systems comprise fixed single configuration systems, and they do not offer any ability to easily change reels or easily replace a depleted battery pack.

SUMMARY OF THE DISCLOSURE

As more electric reels come onto the market, there is a need to provide an improved rod system which can more easily be adapted to a variety of electric reels and/or other rod options.

According to exemplary embodiments of the invention, a fishing rod assembly in accordance with the teachings herein includes an integral energy source located in a removable rod butt assembly of the fishing rod. The rod butt assembly of the fishing rod removably interfaces with a customized reel seat assembly with mating mechanical ferrule and electrical connectors and wiring harnesses that extends up through the inside of the reel seat to a wiring/power connector egress above the reel seat. The rod butt assembly can be selectively removed from the reel seat assembly and easily replaced during use.

The rod butt assembly may include a tubular battery housing, a gimbal secured at the far butt end of the battery housing, a rechargeable battery cell assembly received within the battery housing, a power switch with an integrated power level indicator, a female ferrule connector body at the upper end of the battery housing and an electrical connector located at the inner end of the female ferrule connector. The battery cell assembly includes an integrated circuit board with a battery management control system which monitors charging, discharging and energy levels as well as temperature and moisture ingress for safety shut off. A wiring harness extends from the battery cell assembly to the power switch for control and then from the switch to the electrical connector.

The reel seat assembly may include a tubular reel seat main body having upper and lower ends and a conventional threaded reel clamping nut on the external surface. A wire guide insert is secured at the lower end of the reel seat and a male ferrule connector body and ferrule nut are in turn secured to a lower end of the wire guide insert. A rod blank receiving tube extends through the tubular interior or the reel seat and is spaced inwardly from the reel seat inner walls by wire guide shims. The shims are not entirely annular and provide a narrow wire channel between the insider of the reel seat and the outside of the rod blank tube.

A power connector egress body is secured at the upper end of the reel seat main body.

A mating electrical connector is located on the end face of the male ferrule connector body, and a wiring harness extends from the connector, through an internal channel in the wire guide insert, through the reel seat wire channel to a connector fitting received in an opening in the power connector egress body. A power connector cord extends from the connector fitting to the reel to complete the electrical circuit from the battery assembly to the reel.

While embodiments of the invention have been described as having the features recited, it is understood that various combinations of such features are also encompassed by particular embodiments of the invention and that the scope of the invention is limited by the claims and not the description.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIG. 3 is a plan view of the present fishing rod assembly;

FIG. 4 is an enlarge plan view thereof focusing on the reel seat and the rod butt;

DETAILED DESCRIPTION OF THE EXEMPLARY EMBODIMENTS

Figure 1:
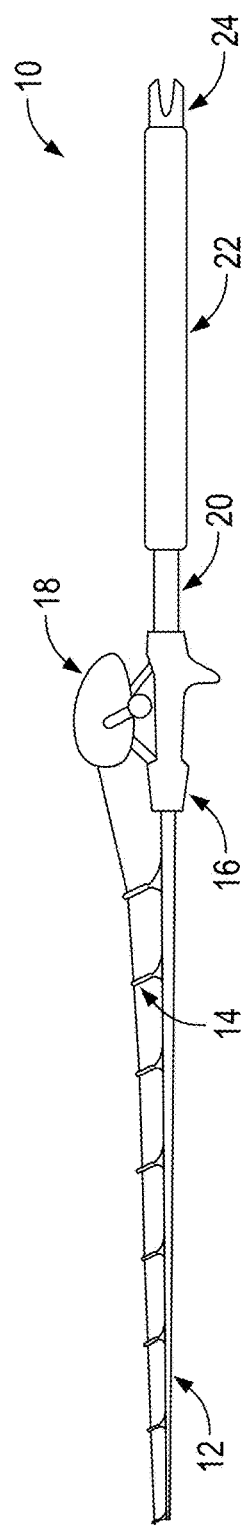
FIG. 1 is a component view of an exemplary prior art fishing rod and reel.
Figure 2:
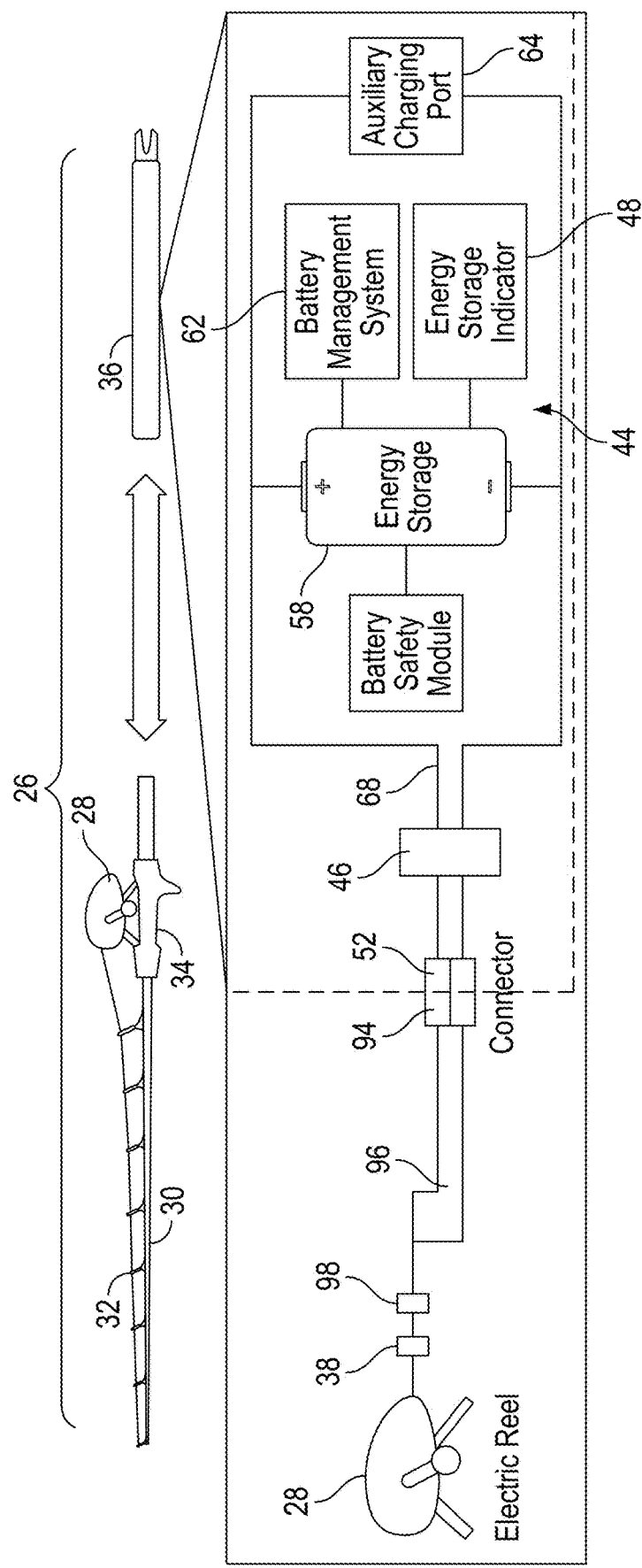
FIG. 2 is a schematic component view of an exemplary fishing rod and reel including a novel energy storage system in the rod butt in accordance with the teachings of the present disclosure.
Figure 5:
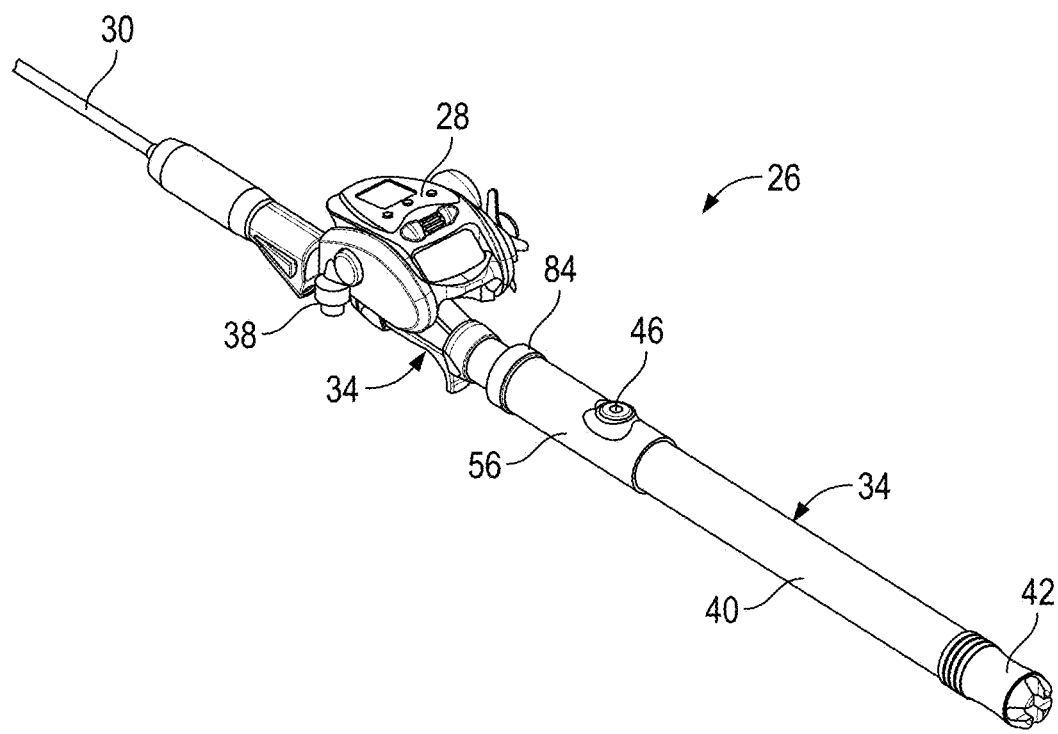
FIGS. 5-6 are top and bottom perspective views thereof.
Figure 6:
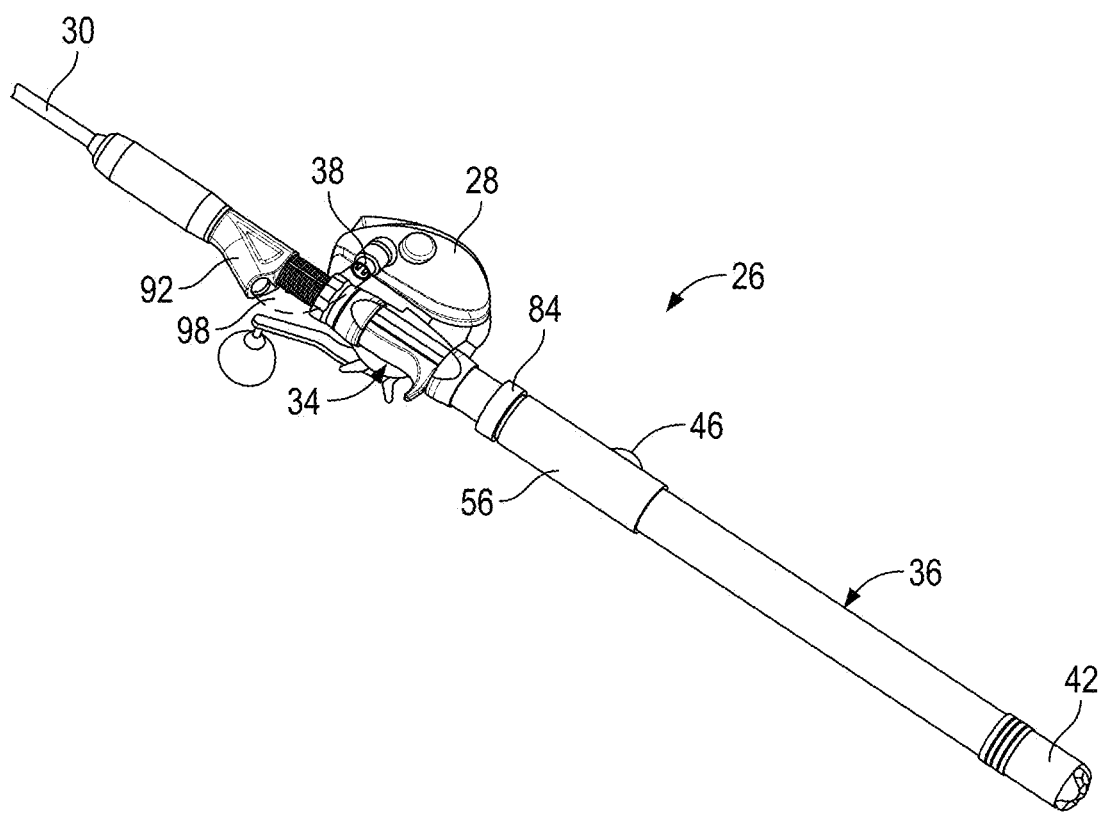
Figure 7:
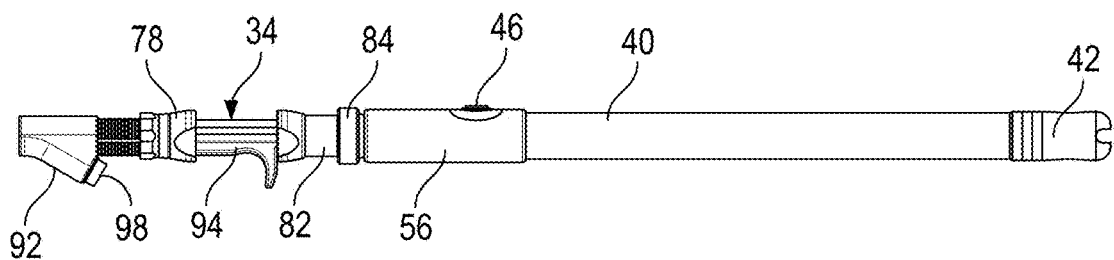
FIG. 7 is an enlarged plan view of the reel seat and rod butt without the reel installed.
Figure 8:
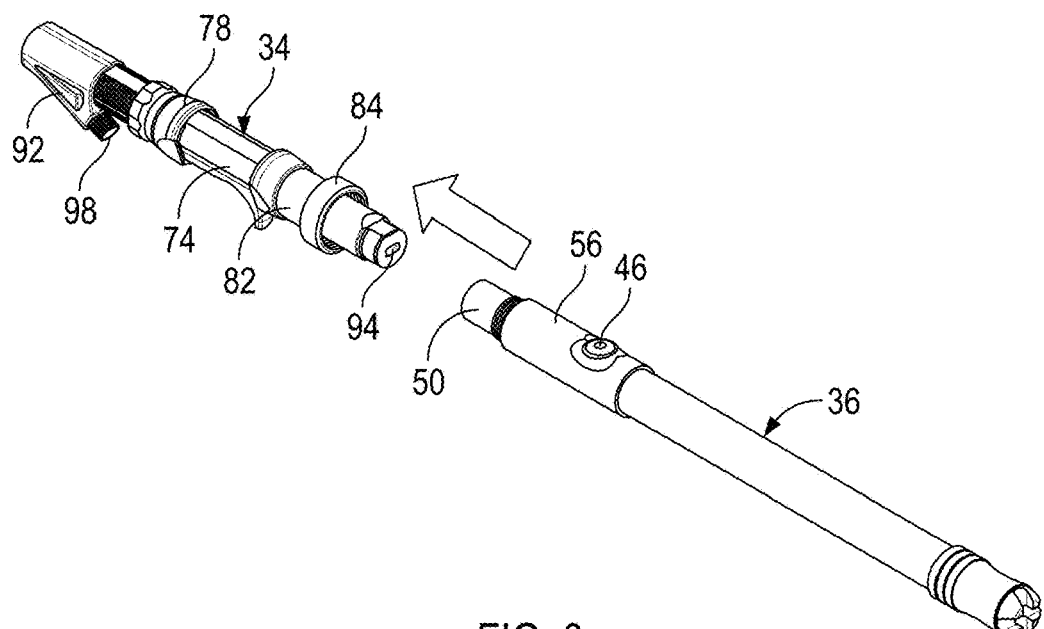
FIG. 8 is an exploded view showing the battery butt removed from the reel seat.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

According to exemplary embodiments of the invention, and referring now to the drawing figures, a fishing rod assembly 26 for use with an electrically powered fishing reel 28 in accordance with the present invention generally comprises a rod blank 30 with eyelets 32, a reel seat assembly 34, and a rod butt assembly 36.

A reel 28 which is electrically motorized, manually operated, or both may be affixed to the reel seat 34 in a conventional manner without modification of the reel 28 (See FIGS. 2-10). The electric reel 28 may have an electrical connector port 38 as is conventional in the current marketplace.

The fishing rod assembly 26 includes an integral energy source located in the rod butt assembly 36 of the fishing rod. One advantage to placing the battery cells into the butt of the rod is that the weight of the batteries is used to counterbalance the weight of the assembly for a more comfortable operation of the rod and better overall usability. The rod butt assembly 36 detachably interfaces with the reel seat assembly 34 with mating ferrule/electrical connectors and wiring harnesses that extend from the rod butt assembly 36 up through the inside of the reel seat assembly 34 to a wiring/power connector egress above the reel seat body. The rod butt assembly 36 can be selectively removed from the reel seat assembly 34 and easily replaced during use.

Figure 11:
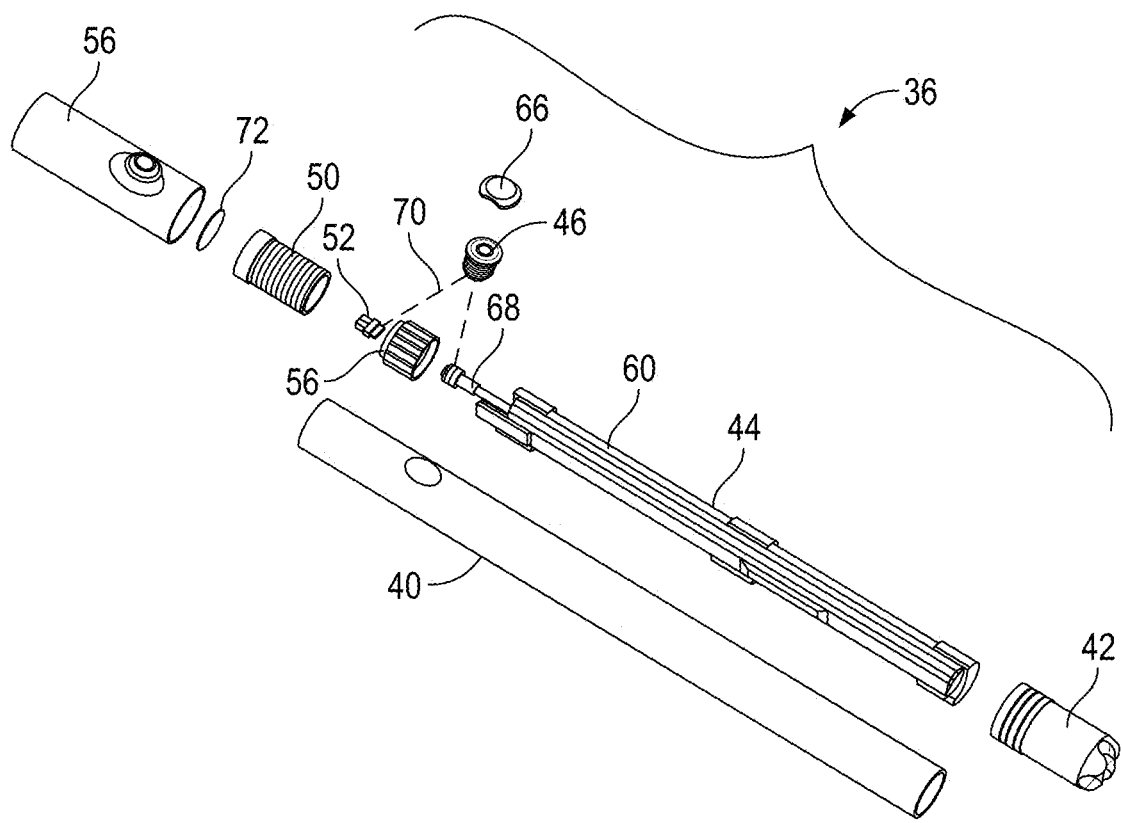
FIG. 11 is an exploded perspective view of the energy storage rod butt assembly.
Figure 12:
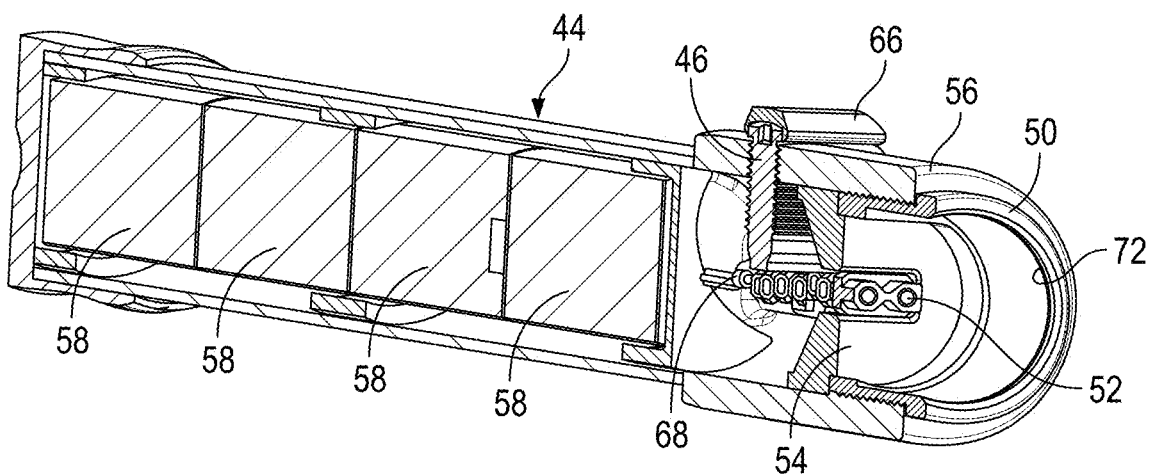
FIG. 12 is a cross-sectional view of the rod butt assembly.

Referring to FIGS. 11-12, the rod butt assembly 36 may generally include a tubular battery housing 40, a gimbal 42 secured at the far butt end of the battery housing, a rechargeable battery cell assembly 44 received within the battery housing, a power switch 46 with an integrated power level indicator 48, a female ferrule connector body 50 at the upper end of the battery housing 40 and an electrical connector 52 located at the inner end of the female ferrule connector body. More specifically, the electrical connector 52 is held a separate connector body 54 received with the lower end of the ferrule connector body 50. A handle/grip housing sleeve 56 surrounds the upper end of the tubular battery housing 40, switch 46, ferrule connector 50 and electric connector body 54.

The outside surface of the upper head end of the ferrule body 50 is threaded to receive a complimentary nut on the opposed reel seat configuration.

The gimbal 42, tubular battery housing 40, female ferrule connector body 50, electrical connector body 54, and handle/grip housing sleeve 56 may be constructed from any suitable material, such as plastic, aluminum or other metals, carbon fiber or other composite materials as may be known in the arts which may capable of withstanding the structural stresses involved in fishing, as well as environmental factors of wind, weather, salt and temperature.

Figure 17:
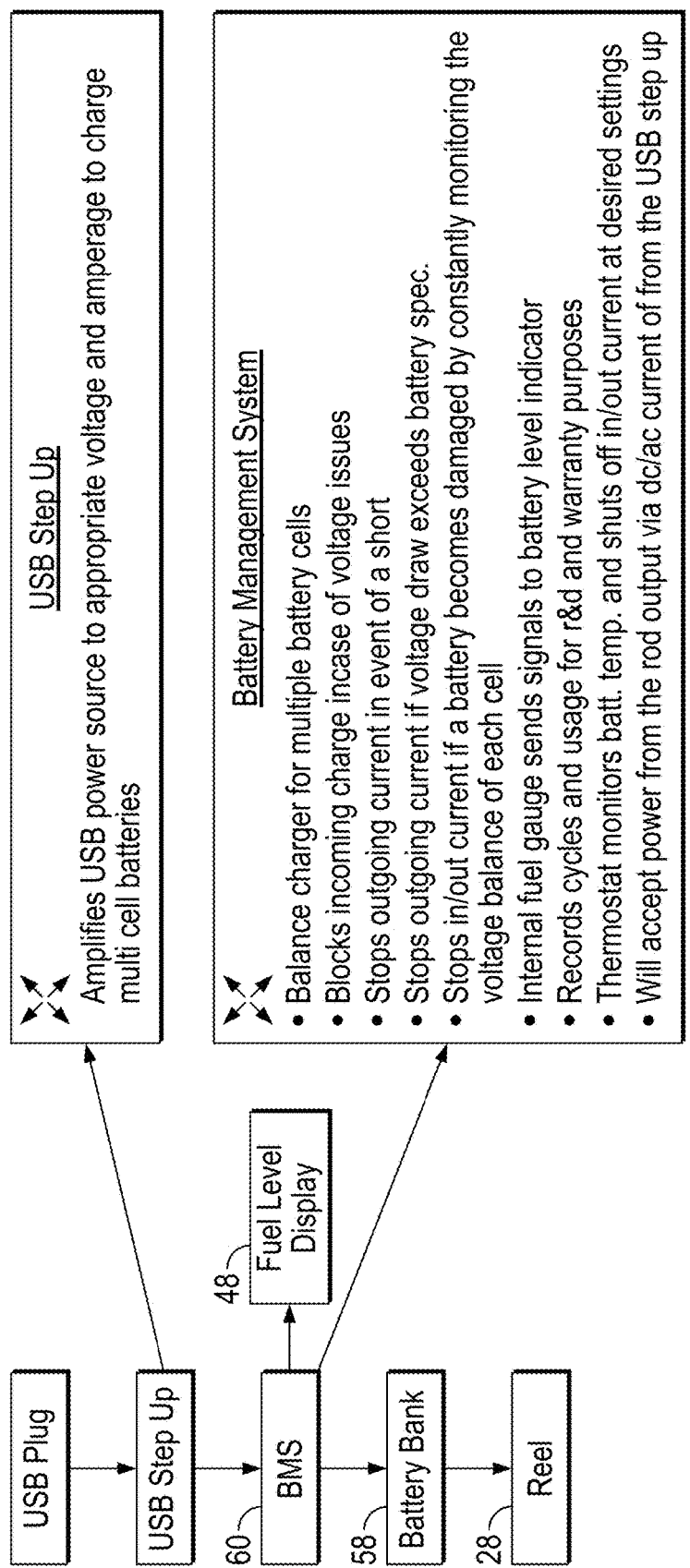
FIG. 17 is a block diagram and explanation of the battery management system.

The battery cell assembly 44 is constructed as an integrated unit and may include a plurality of rechargeable battery cells 58 wired in series to achieve the necessary charging and discharging specifications for powering electric reels 28 (See FIGS. 11-12). The battery cells 58 may comprise any suitable recharging battery chemistry, such as lithium-ion battery cells, lithium iron phosphate (LiFePO4) battery cells and lithium polymer battery cells. However, the noted chemistries should not be considered as limiting. The battery cell assembly 44 includes an integrated circuit board 60 with a battery management control system 62 which monitors charging, discharging and energy levels as well all other aspects of battery function including temperature levels and moisture ingress for safety shut off (See FIG. 17). The battery management system 62 may be further effective for balancing charging of multiple battery cells connector in series, blocking incoming charge in the event of voltage issues, stopping outgoing current in the event of a short, exceeding temperature threshold or an electric short caused by water or moisture ingress, stopping current outgoing current if the voltage draw exceeds battery operating specifications, stopping outgoing current if damage to the battery system is detected, monitoring and displaying battery charge levels, recording charge/discharge cycles for warranty and troubleshooting. monitoring operating temperature to prevent overheating and potential fire issues, The battery cell assembly 44 can be charged from the connector 52 (FIGS. 10-12), or alternatively from an auxiliary charging port 64, such as an integrated USB port (See FIGS. 2 and 17). In this regard, the battery management system 62 may include a USB low voltage step up circuit to amplify low voltage USB power sources to an appropriate voltage and amperage capable of charging the multi-cell battery pack (See FIG. 17).

Figure 15:
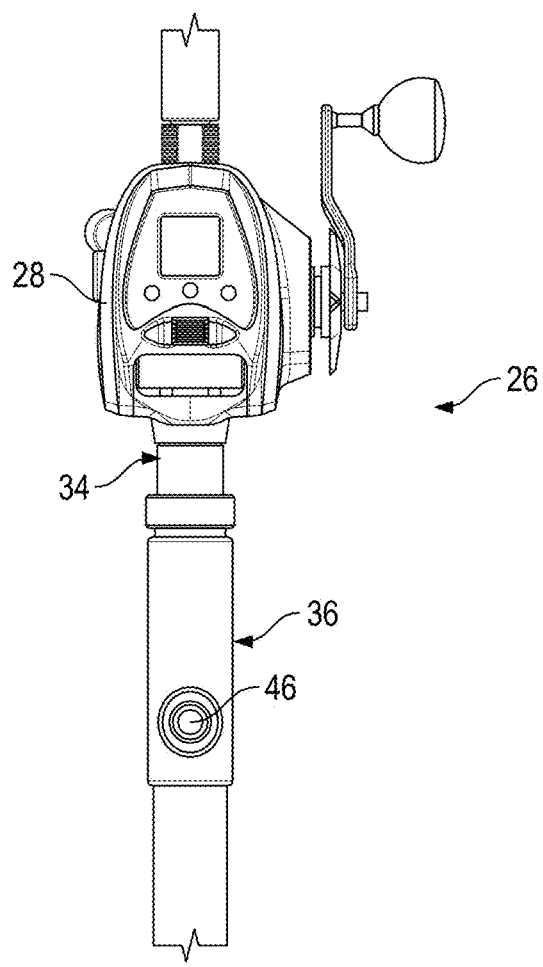
FIG. 15 is a top view of the rod butt connector housing and the reel seat showing location of the power button.
Figure 16:
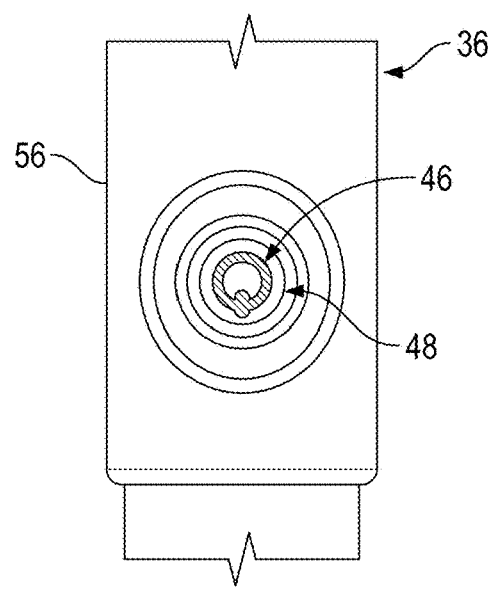
FIG. 16 is an enlarged view thereof illustrating the power button and integral battery capacity illumination using a color changing LED within the button surface.

The switch 46 may be any suitable electrical switch to provide a variety of touch or tactile operational features, and may include an integrated power level indicator in the form of a lighted LED indicator 48, which may change colors based on battery level, for example, green (70-100% charge), blue (30-70% charge), red (10-30% Charge) and blinking red (0-10% charge) or reserve charge. (See FIGS. 15-16). A clear or translucent neoprene rubber cover 66, or other watertight cover, may be positioned over the exposed switch button which extends through the battery tube housing 40 and the handle/grip housing sleeve 56.

Figure 10:
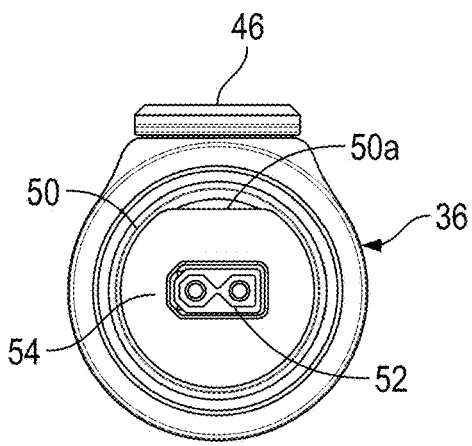
FIG. 10 is an end view of the rod butt showing the female ferrule connection and mating electrical connector.

The electrical connector 52 may comprise any reliable mating contact assembly, but may preferably comprise a male XT30 connector (See FIG. 10). As will be described further below, the reel seat assembly 34 includes a mating female XT30 connector.

A wiring harness 68 extends from the battery cell assembly 44 to the power switch 46 for selective control and for battery level signals to the LED indicator, and a further two-wire pair 70 extends from the switch 46 to the XT30 electrical connector 52.

An O-ring 72 may be located within the externally threaded head portion of the ferrule connection 50 to provide a watertight seal between the reel seat ferrule and the battery butt ferrule 50.

Figure 13:
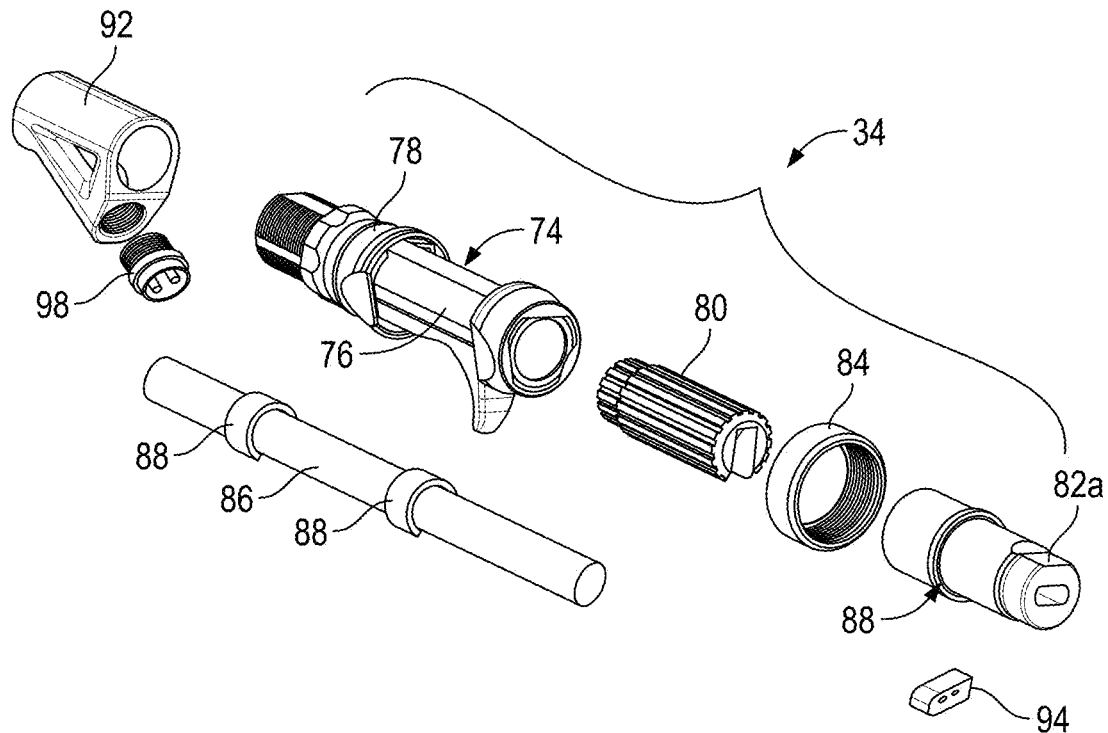
FIG. 13 is an exploded perspective view of the reel seat assembly.
Figure 14:
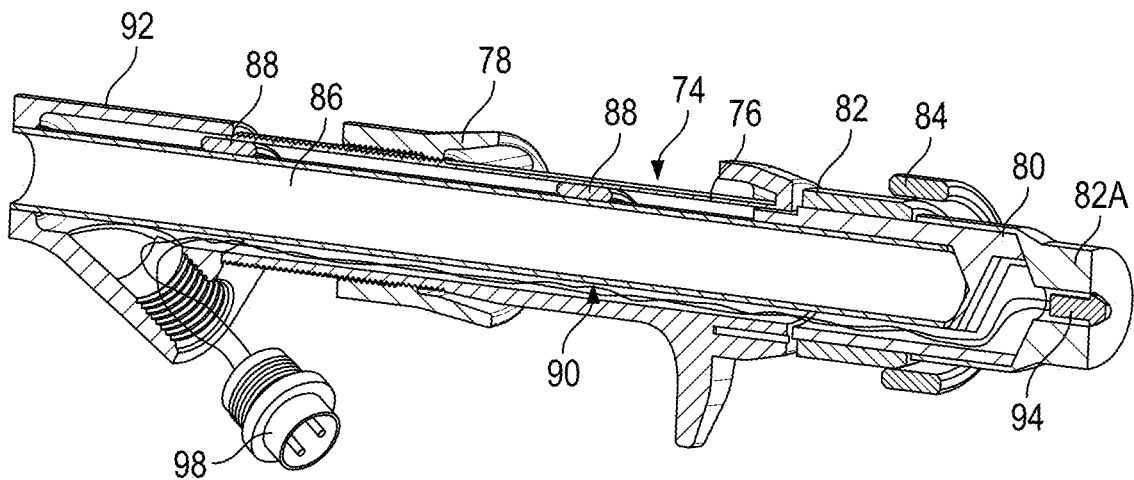
FIG. 14 is a cross-section view of the reel seat assembly.

Referring now to FIGS. 13-14, the reel seat assembly 34 may include a reel seat 74 having a tubular reel seat body 76 with upper and lower ends and a conventional threaded reel clamping nut 78 on the external surface. The reel seat main body 76 may be a conventional off the shelf reel seat configuration constructed from a durable, weather resistant metal as known in the art. To provide a connection to the rod butt assembly 36, a wire guide/ferrule connector insert 80 is secured at the lower end of the reel seat body 76 and a male ferrule connector body 82 and an inwardly threaded ferrule nut 84 are in turn secured to a lower end of the insert 80. A rod blank receiving tube 86 extends through the tubular interior or the reel seat 76 and is spaced inwardly from the reel seat inner walls by C-shaped wire guide shims 88. The C-shaped shims 88 are not entirely annular and cooperate to provide a narrow wire channel 90 along the bottom side of the reel seat 76, between the inner surface of the reel seat 76 and the outside surface of the rod blank tube 86 (See FIG. 14).

A V-shaped power connector egress body 92 is secured at the upper end of the reel seat main body 76. It is noted here that any conventional rod blank 30 may be received though the egress body 92 and secured into the inner portion rod blank tune 86 within the reel seat 76 as known in a conventional rod assembly.

A mating female electrical connector 94 (XT-30) is located in an opening on the end face of the male ferrule connector body 82 (See FIG. 9), and a wiring pair 96 extends from the XT-30 connector 94, through an internal channel in the wire guide insert 80, through the reel seat wire channel 90 to an industry standard reel connector fitting 98 (2-pin GX16 connector) received (threaded) into an opening in the power connector egress body 92. Adapters can be provided for larger GX-12/super air connections.

Figure 25:
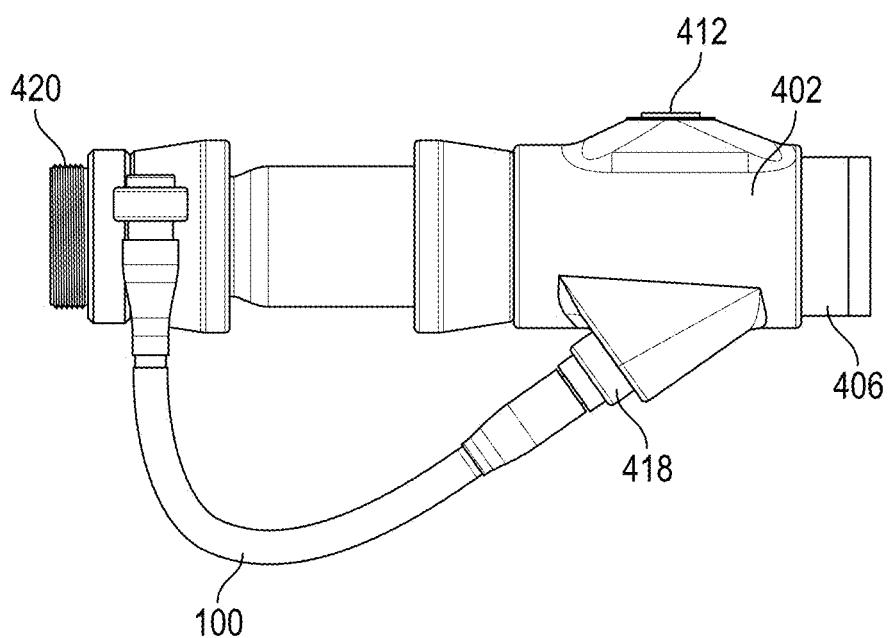

A power connector cord 100 (GX-16 air cable) (See example in FIG. 25) may extend from the connector fitting 98 to the reel connector 38 to complete the electrical circuit from the battery assembly 44 to the reel 28.

Figure 9:
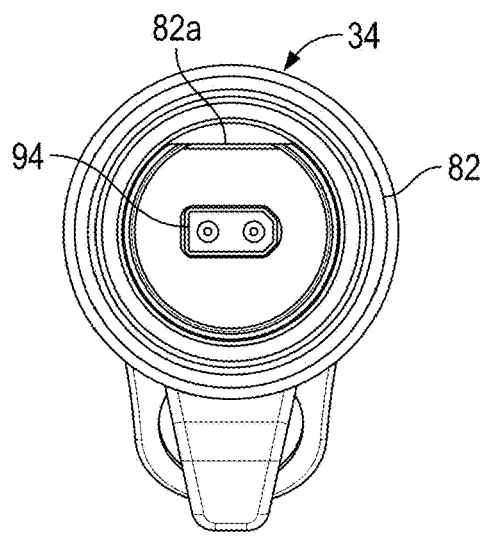
FIG. 9 is an end view of the reel seat showing the male ferrule connection and electrical connector.

Referring briefly back to FIGS. 9 and 10, it can be seen that the interfitting male and female ferrule bodies 50/82 have complimentary anti-rotation surfaces, i.e. flat areas 50A and 82A which serve to orient assembly of the butt and reel seat and the internal XT-30 connectors 52/94 as well as prevent rotation of the butt and reel seat once assembled and locked with the threaded ferrule connection.

The power connector egress body 92, rod blank tube 86, wire shims 88, wire guide insert 80, ferrule connector body 82 and ferrule nut 84 may be constructed from any suitable material, aluminum or other metals, reinforced plastic, carbon fiber or other composite materials as may be known in the arts which may capable of withstanding the structural stresses involved in fishing as well as environmental factors of wind, weather, salt and temperature.

Figure 18:
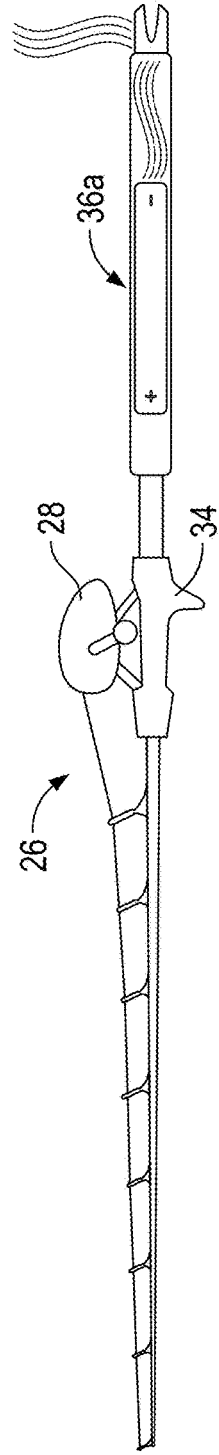
FIG. 18 illustrates a heat conducting butt assembly which facilitate the dissipation of heat generated from the battery system during battery discharge.

Referring to FIG. 18, some embodiments of the reel butt assembly 36A may include heat conducting materials which will facilitate the dissipation of heat generated from the battery assembly during battery charging and discharging.

Figure 19:
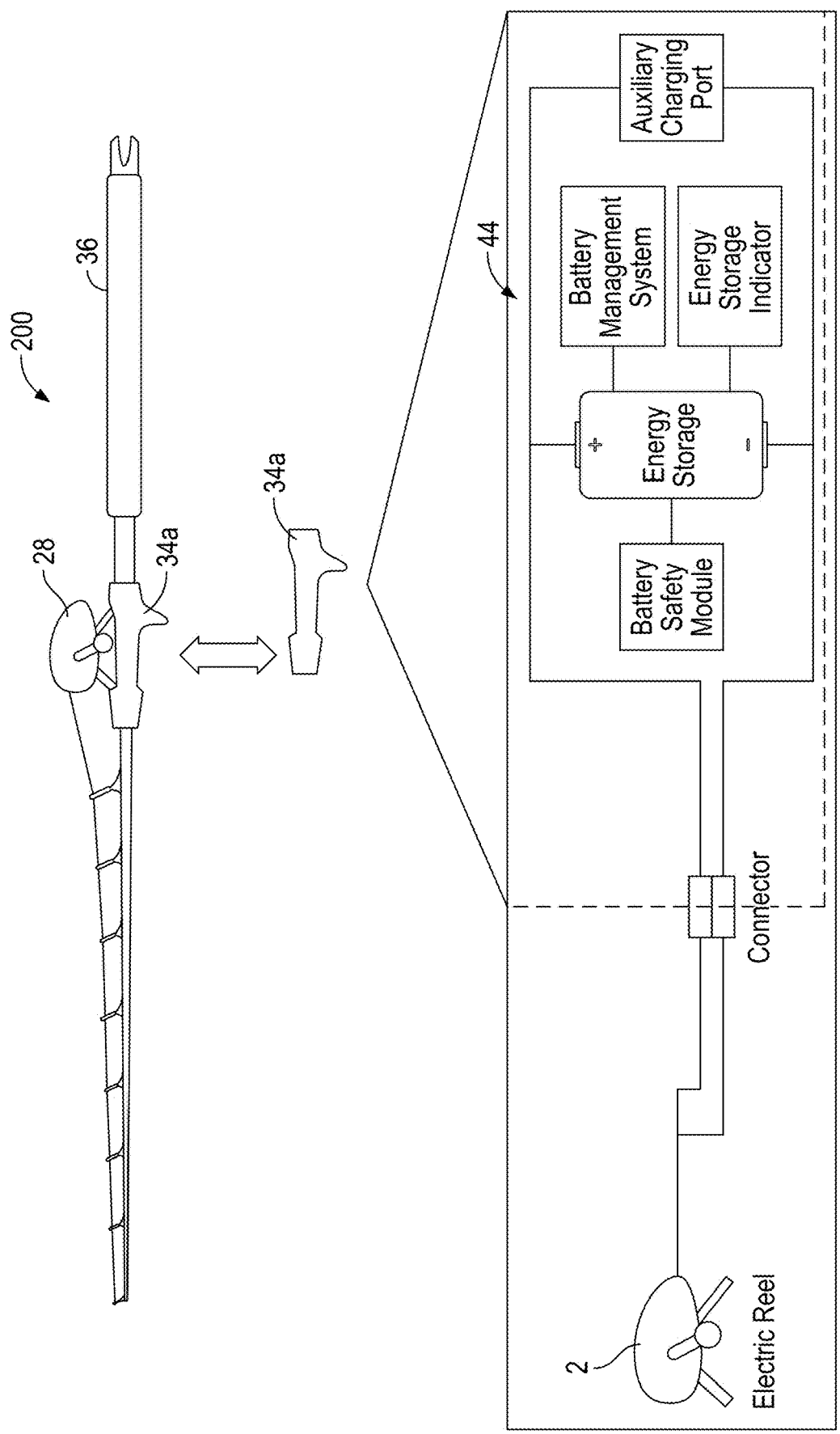
FIG. 19 illustrates an alternative rod assembly and system where the energy storage is housed within the reel seat portion of the rod.

Referring to FIG. 19, some embodiments of the invention may comprise a rod assembly 200 where the energy storage assembly 44 is integrated and housed within a novel reel seat assembly 34A. Such an assembly could include a conventional reel electrical connector cable extending from the reel seat assembly 34A.

Figure 20:
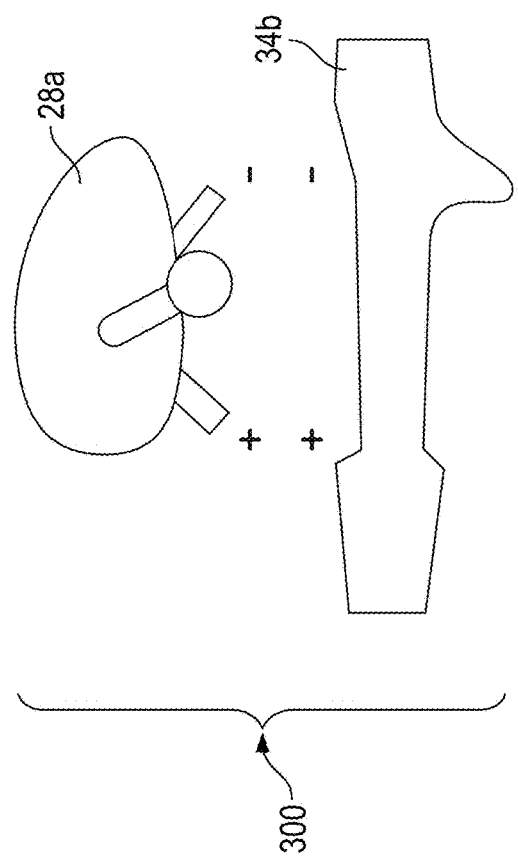
FIG. 20 illustrates a novel electrical connection between an electric reel and reel seat where contacts are integrated into the seat engagement areas thereof.

Referring to FIG. 20, some embodiments of the invention may comprise a rod assembly 300 including a novel direct electrical connection between an electric reel 28A and a novel reel seat 34B where the electrical contacts for the reel 28A are integrated into the seat engagement areas thereof. Such an assembly could be utilized with an energy storage system 44 located anywhere within the rod assembly, such as for example, in the rod butt 36 or the reel seat 34 itself.

Figure 21:
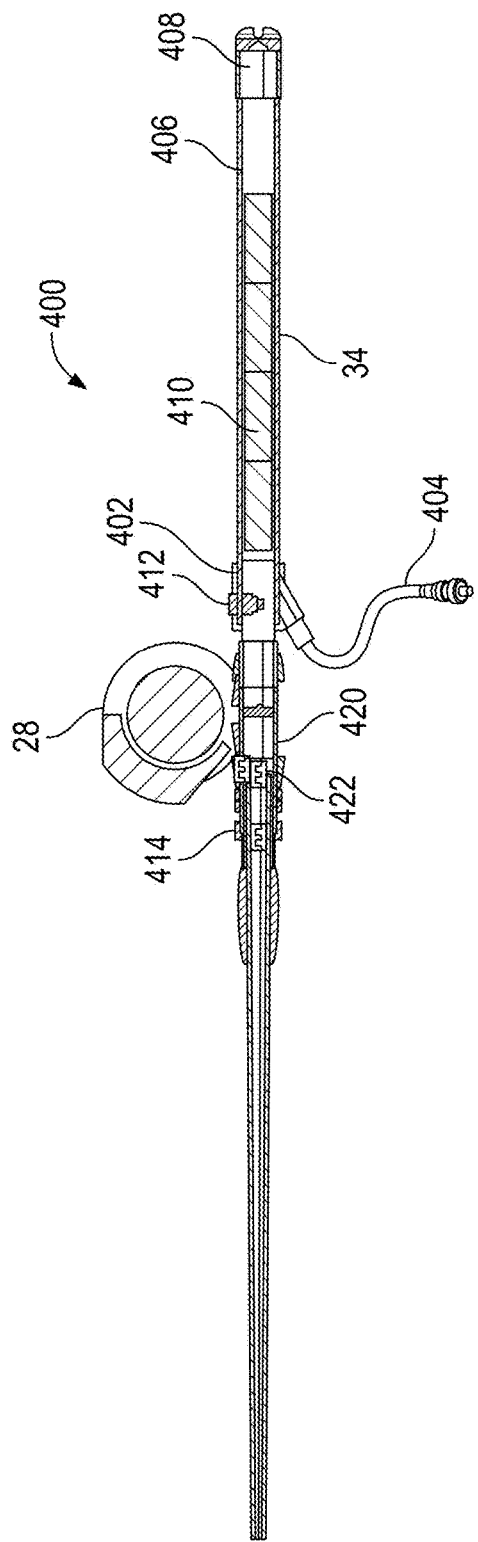
FIG. 21 illustrates a novel electric rod assembly where the energy storage system is integrated directly within the rod butt, but rod butt is not separable from the reel seat.
Figure 22:
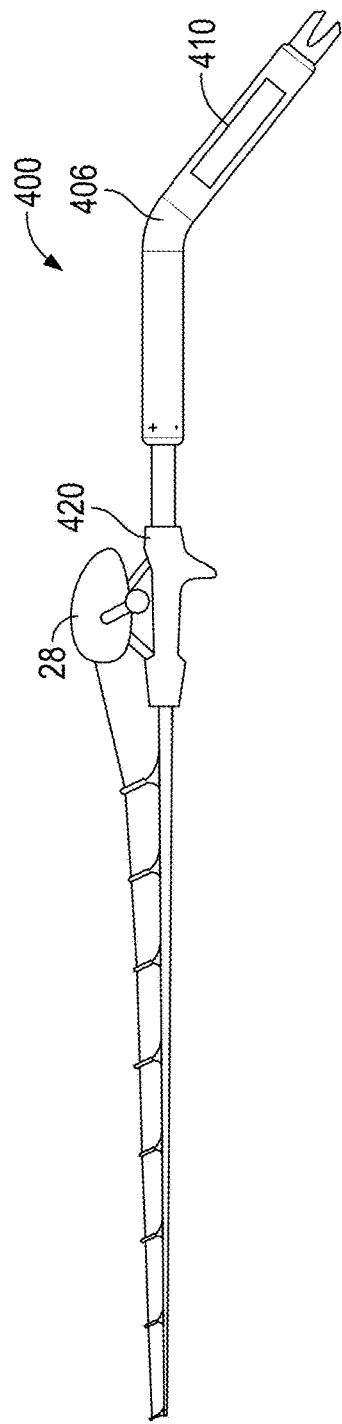
FIGS. 22-25 illustrates an alternative bent butt rod assembly wherein the electrical connector egress is located below the reel seat.
Figure 23:
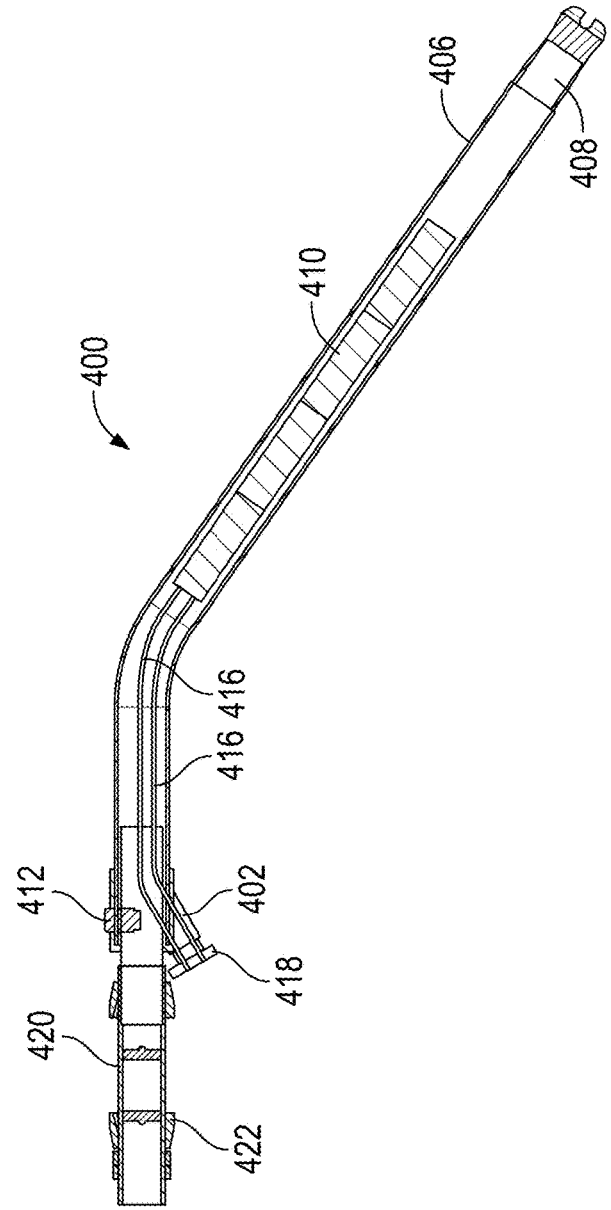
Figure 24:
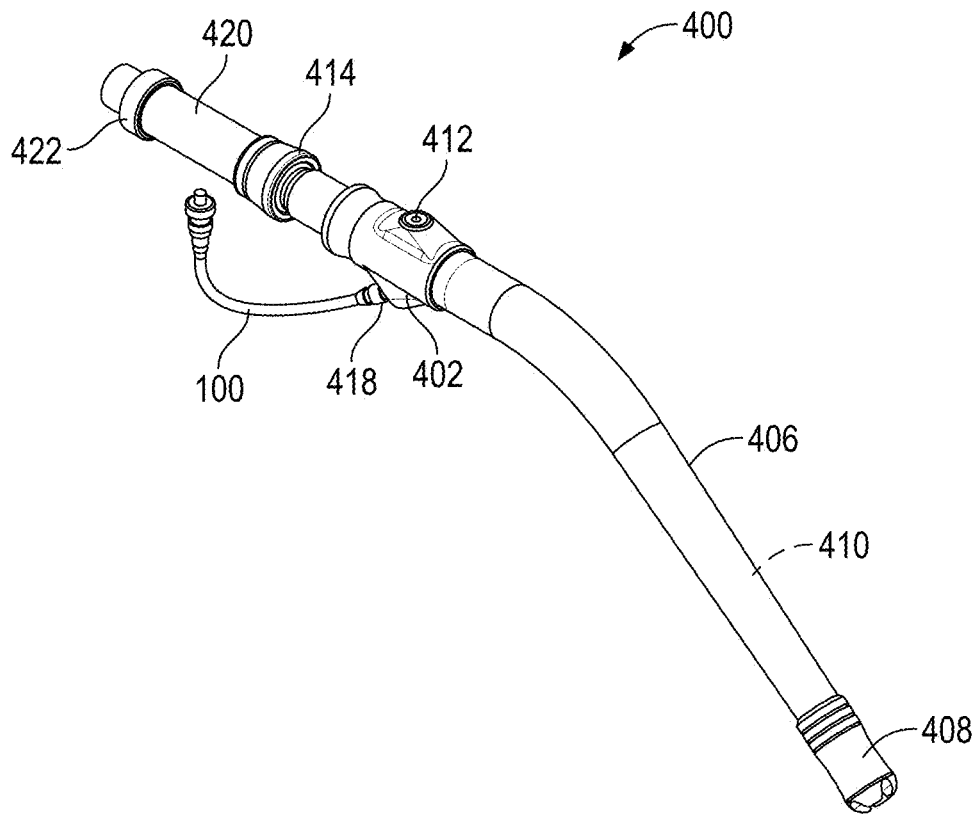

Referring to FIGS. 21 through 25, an alternative rod butt and reel assembly 400 is illustrated wherein a power egress body 402 and electrical connector cable 404 are located directly at the top of the rod butt assembly 400. Such as configuration may be used in a straight rod butt configuration as illustrated in FIG. 21, or a bent rod butt configuration as illustrated in FIGS. 22-25.

The alternative fishing rod butt and reel seat assembly 400 for electrically powered reels may comprise a tubular battery housing 406, a gimbal 408 secured at a terminal end of the battery housing, a rechargeable battery cell assembly 410 received within the battery housing, a power switch 412 in electrical communication with the battery cell assembly 410, a ferrule connector body 414 at an upper end of the battery housing, power egress body 402 secured to the upper end of the tubular battery housing 406, a wiring harness 416 in electrical communication with the power switch 412 and extending to a reel connector fitting 418 received in an opening in the power egress body 402, and a reel seat assembly 420 received at an upper end of the power egress body 402 wherein the reel seat assembly 420 has a ferrule connector 422 for receiving nearly any offshore rod blank assembly.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fishing rod assembly for electrically powered reels comprising:
    a rod butt assembly comprising:
        a tubular battery housing,
        a gimbal secured at a terminal end of the battery housing,
        a rechargeable battery cell assembly received within the battery housing,
        a power switch in electrical communication with the battery cell assembly,
        a ferrule connector body at an upper end of the battery housing,
        an electrical connector located within the ferrule connector, the electrical connector in electrical communication with the power switch; and
    a reel seat assembly comprising:
        a reel seat having a tubular body with upper and lower ends and a reel clamping nut,
        a wire guide insert having an upper end thereof secured to a lower end of the tubular body of the reel seat,
        a ferrule connector body received on a lower end of the wire guide insert,
        a receiving tube extending through the tubular body of the reel seat for receiving a rod blank, the outer surface of the receiving tube being spaced inwardly from an inner surface of the reel seat tubular body by a plurality of C-shaped shims thereby providing a wire channel between the inside surface of the reel seat and the outside of the receiving tube,
        a power egress body secured to the upper end of the reel seat tubular body,
        an electrical connector located on an end face of the ferrule connector body,
        a wiring harness extending from the connector, through a wire channel in the wire guide insert, through the wire channel in the reel seat to a reel connector fitting received in an opening in the power egress body,
    wherein the rod butt assembly and the reel seat assembly are selectively receivable and securable together in assembled relation and a power circuit between the rechargeable power cell assembly and the reel connector fitting is completed by interfitting of the male and female ferrule connectors and associated electrical connectors in assembled relation.

2. The fishing rod assembly of claim 1 wherein the power switch includes an integrated visual battery power level indicator.

3. The fishing rod assembly of claim 2, wherein the visual power level indicator comprises an LED and an integrated circuit which changes the color of the LED based on battery level.

4. The fishing rod assembly of claim 3 wherein the battery cell assembly includes an integrated circuit with a battery management control system for monitoring charging, discharging and energy levels.

5. The fishing rod assembly of claim 4 wherein the battery management control system includes a moisture sensor for monitoring moisture ingress for safety shut off.

6. The fishing rod assembly of claim 4 wherein the rod butt assembly includes a female ferrule connector body at an upper end of the battery housing, and the electrical connector located at an inner end of the ferrule connector, and the reel seat assembly includes a male ferrule connector body and ferrule nut at a lower end of the wire guide insert, and the electrical connector is located on an end face of the male ferrule connector body.

7. The fishing rod assembly of claim 3 wherein the rod butt assembly includes a female ferrule connector body at an upper end of the battery housing, and the electrical connector located at an inner end of the ferrule connector, and the reel seat assembly includes a male ferrule connector body and ferrule nut at a lower end of the wire guide insert, and the electrical connector is located on an end face of the male ferrule connector body.

8. The fishing rod assembly of claim 2 wherein the battery cell assembly includes an integrated circuit with a battery management control system for monitoring charging, discharging and energy levels.

9. The fishing rod assembly of claim 8 wherein the battery management control system includes a moisture sensor for monitoring moisture ingress for safety shut off.

10. The fishing rod assembly of claim 1 wherein the battery cell assembly includes an integrated circuit with a battery management control system for monitoring charging, discharging and energy levels.

11. The fishing rod assembly of claim 10 wherein the battery management control system includes a moisture sensor for monitoring moisture ingress for safety shut off.

12. The fishing rod assembly of claim 1 wherein the rod butt assembly includes a female ferrule connector body at an upper end of the battery housing, and the electrical connector located at an inner end of the ferrule connector, and the reel seat assembly includes a male ferrule connector body and ferrule nut at a lower end of the wire guide insert, and the electrical connector is located on an end face of the male ferrule connector body.

13. The fishing rod assembly of claim 12 wherein the interfitting ferrule connector bodies include mating anti-rotation surfaces.

14. The fishing rod assembly of claim 1 wherein the interfitting ferrule connector bodies include mating anti-rotation surfaces.

15. A fishing rod butt and reel seat assembly for electrically powered reels comprising:
    a tubular battery housing;
    a gimbal secured at a terminal end of the battery housing;
    a rechargeable battery cell assembly received within the battery housing;
    a power switch in electrical communication with the battery cell assembly;
    a ferrule connector body at an upper end of the battery housing;
    a power egress body secured to the upper end of the tubular battery housing;
    a wiring harness in electrical communication with the power switch and extending to a reel connector fitting received in an opening in the power egress body; and a reel seat assembly received at an upper end of the power egress body, the reel seat assembly having a ferrule connector for receiving a rod blank assembly.

16. The fishing rod assembly of claim 15 wherein the power switch includes an integrated battery power level indicator.

17. The fishing rod assembly of claim 16 wherein the power level indicator comprises an LED and an integrated circuit which changes the color of the LED based on battery level.

18. The fishing rod assembly of claim 16 wherein the battery cell assembly includes an integrated circuit with a battery management control system for monitoring charging, discharging and energy levels.

19. The fishing rod assembly of claim 15 wherein the battery cell assembly includes an integrated circuit with a battery management control system for monitoring charging, discharging and energy levels.

20. The fishing rod assembly of claim 19 wherein the battery management control system includes a moisture sensor for monitoring moisture ingress for safety shut off.

\* \* \* \* \*